United States Patent
Yang

(10) Patent No.: US 10,657,357 B2
(45) Date of Patent: May 19, 2020

(54) FINGERPRINT IDENTIFICATION PANEL AND A METHOD FOR DRIVING THE SAME, AND DISPLAY APPARATUS

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Qing Yang, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 139 days.

(21) Appl. No.: 15/744,990

(22) PCT Filed: Jul. 24, 2017

(86) PCT No.: PCT/CN2017/094073
§ 371 (c)(1),
(2) Date: Jan. 15, 2018

(87) PCT Pub. No.: WO2018/054158
PCT Pub. Date: Mar. 29, 2018

(65) Prior Publication Data
US 2019/0012518 A1 Jan. 10, 2019

(30) Foreign Application Priority Data

Sep. 22, 2016 (CN) .......................... 2016 1 0843173

(51) Int. Cl.
*G06K 9/00* (2006.01)
*G06F 3/044* (2006.01)
(Continued)

(52) U.S. Cl.
CPC ......... *G06K 9/00087* (2013.01); *G06F 3/044* (2013.01); *G06F 3/0416* (2013.01);
(Continued)

(58) Field of Classification Search
None
See application file for complete search history.

(56) References Cited

U.S. PATENT DOCUMENTS

2005/0088185 A1* 4/2005 Sano .................... A61B 5/1077
324/661
2008/0309632 A1 12/2008 Westerman et al.
(Continued)

FOREIGN PATENT DOCUMENTS

CN 102566840 A 7/2012
CN 105528118 A 4/2016
(Continued)

OTHER PUBLICATIONS

International search report dated Oct. 20, 2017 for corresponding application No. PCT/CN2017/094073 with English translation attached.
(Continued)

*Primary Examiner* — Wei Wen Yang
(74) *Attorney, Agent, or Firm* — Nath, Goldberg & Meyer; Joshua B. Goldberg

(57) ABSTRACT

Provided is a fingerprint identification panel comprising multiple first electrode strips, multiple second electrode strips, a scanning device, a sensing signal providing device and an identification device, wherein the first electrode strips and the second electrode strips are insulated from and intersected with each other; the scanning device is configured to provide driving signals to the plurality of first electrode strips in turn, the sensing signal providing device is configured to provide sensing signals to the second electrode strips, and a capacitor is formed between each first
(Continued)

electrode strip and a second electrode strip adjacent thereto; the plurality of second electrode strips are connected with the identification device, and transmit signals that reflect quantities of the capacitors to the identification device, the identification device is configured to determine a morphology of a fingerprint based on the signals.

20 Claims, 3 Drawing Sheets

(51) Int. Cl.
    *G06F 3/041*     (2006.01)
    *G09G 3/20*     (2006.01)

(52) U.S. Cl.
    CPC .......... *G06K 9/0002* (2013.01); *G06F 3/0412* (2013.01); *G09G 3/20* (2013.01); *G09G 2310/0286* (2013.01)

(56) References Cited

U.S. PATENT DOCUMENTS

| | | | |
|---|---|---|---|
| 2016/0140376 A1 | 5/2016 | Kremin et al. | |
| 2016/0154988 A1* | 6/2016 | Benkley, III | G01N 27/04 |
| | | | 382/124 |
| 2016/0358003 A1* | 12/2016 | Shen | G06K 9/0002 |
| 2017/0123566 A1* | 5/2017 | Noguchi | G06F 3/0416 |
| 2017/0285816 A1* | 10/2017 | Mizuhashi | G06F 3/0412 |

FOREIGN PATENT DOCUMENTS

| | | |
|---|---|---|
| CN | 106250889 A | 12/2016 |
| CN | 206133607 U | 4/2017 |

OTHER PUBLICATIONS

Chinese office action dated Apr. 10, 2018 for corresponding application No. 201610843173.9 with English translation attached.

* cited by examiner

US 10,657,357 B2

FINGERPRINT IDENTIFICATION PANEL AND A METHOD FOR DRIVING THE SAME, AND DISPLAY APPARATUS

CROSS-REFERENCE TO RELATED APPLICATION

This is a National Phase Application filed under 35 U.S.C. 371 as a national stage of PCT/CN2017/094073, filed Jul. 24, 2017 an application claiming the benefit of Chinese Application No. 201610843173.9, filed Sep. 22, 2016, the content of each of which is hereby incorporated by reference in its entirety.

TECHNICAL FIELD

The present application relates to the field of fingerprint identification apparatus, and particularly to a fingerprint identification panel, a display apparatus comprising the fingerprint identification panel and a method for driving the fingerprint identification panel.

BACKGROUND

At present, many electronic apparatuses are provided with a fingerprint identification device so as to enhance security of the electronic apparatus. Common fingerprint identification device is a self-capacitive fingerprint identification device. In particular, the fingerprint identification device comprises a plurality of fingerprint identification electrodes, and each fingerprint identification electrode is connected with a signal lead wire. In a case that a fingerprint covers the fingerprint identification electrode, a capacitor is formed between the fingerprint and the fingerprint identification electrode, and a signal is output to a corresponding signal lead wire. The morphology of the fingerprint can be determined by the signal output from the signal lead wire.

SUMMARY

The present application provides a fingerprint identification panel, a display apparatus and a method for driving the fingerprint identification panel. In the fingerprint identification panel, the number of the electrodes for identifying a fingerprint is large and a space occupied by lead wires is small.

The present application provides a fingerprint identification panel comprising a plurality of first electrode strips, a plurality of second electrode strips, a scanning device, a sensing signal providing device and an identification device, wherein the plurality of first electrode strips and the plurality of second electrode strips are insulated from and intersected with each other;

the scanning device is configured to provide driving signals to the plurality of first electrode strips in turn, and the sensing signal providing device is configured to provide sensing signals to the plurality of second electrode strips, and a capacitor is formed between each of the plurality of first electrode strips and one second electrode strip adjacent to the first electrode strip;

the plurality of second electrode strips are connected with the identification device, and are configured to transmit signals that reflect electricity quantities of the capacitors to the identification device; and the identification device is configured to determine a morphology of a fingerprint based on the signals received from the second electrode strips.

Optionally, each of the first electrode strips include a plurality of first sub-electrodes electrically connected in series, each of the second electrode strips include a plurality of second sub-electrodes electrically connected in series, and the fingerprint identification panel further comprises a base substrate, the first sub-electrodes and the second sub-electrodes are provided on the base substrate.

Optionally, both the first sub-electrodes and the second sub-electrodes have a maximum length no larger than 50 μm.

Optionally, both the first sub-electrodes and the second sub-electrodes are made of transparent material.

Optionally, both the first sub-electrodes and the second sub-electrodes are of a diamond shape.

Optionally, the plurality of first electrode strips and the plurality of second electrode strips are provided on different base substrates.

Optionally, the scanning device includes a plurality of cascaded shift registers, each shift register corresponds to one first electrode strip, and the shift register is configured to provide a driving signal to the first electrode strip corresponding to the shift register.

Optionally, the scanning device includes a clock signal line, a trigger signal input terminal and a reset signal input terminal, each shift register includes a clock signal terminal, a signal input terminal, a low level signal terminal, a storage capacitor, a plurality of transistors, a reset terminal and a signal output terminal, and the plurality of transistors include a pull-up transistor, an input transistor, a pull-down transistor and a pull-down control transistor, wherein the clock signal terminal is connected with the clock signal line;

a first electrode of the input transistor is connected with the signal input terminal, and a gate of the input transistor is connected with the first electrode of the input transistor;

a gate of the pull-up transistor is connected with a second electrode of the input transistor, a first electrode of the pull-up transistor is connected with the clock signal terminal, and a second electrode of the pull-up transistor is connected with the signal output terminal;

a first terminal of the storage capacitor is connected with the gate of the pull-up transistor, and a second terminal of the storage capacitor is connected with the second electrode of the pull-up transistor;

a gate of the pull-down transistor and a gate of the pull-down control transistor are connected and both are connected with the reset terminal of the shift register, a first electrode of the pull-down transistor is connected with the signal output terminal, and a second electrode of the pull-down transistor is connected with the low level signal terminal;

a first electrode of the pull-down control transistor is connected with the second electrode of the input transistor, and a second electrode of the pull-down control transistor is connected with the low level signal terminal;

the signal input terminal of the shift register of a first stage is connected with the trigger signal input terminal, and the signal input terminal of each of the shift registers of the remaining stages is connected with the signal output terminal of the shift register of a previous stage; and the reset terminal of the shift register of a last stage is connected with the reset signal input terminal, and the reset terminal of each of the shift registers of the remaining stages is connected with the signal output terminal of the shift register of a next stage.

Optionally, the plurality of transistors are N type transistors.

Optionally, the identification device is further configured to determine a position of a finger touching the fingerprint identification panel based on the signals received from the second electrode strips.

As another aspect of the present application, there is further provided a display apparatus, which comprises a fingerprint identification panel and a display panel, wherein the fingerprint identification panel is the above fingerprint identification panel.

Optionally, the display apparatus further comprises a comparison device, wherein a standard fingerprint is stored in advance in the comparison device and the comparison device is configured to judge whether or not a fingerprint identified by the fingerprint identification panel matches with the standard fingerprint.

Optionally, the fingerprint identification panel is configured to identify a fingerprint in real time, and the fingerprint identification panel is further configured to determine a position of a touch point, and the comparison device is configured to generate an instruction for controlling the display apparatus to stop performing a touch operation in case of mismatch between the fingerprint identified by the fingerprint identification panel and the standard fingerprint.

Optionally, in a case that the first sub-electrodes and the second sub-electrodes are made of transparent material, the fingerprint identification panel is provided on a light emergent side of the display panel.

As still another aspect of the present application, there is further provided a method for driving the above fingerprint identification panel to identify a fingerprint, the method comprising:

applying, by the scanning device, driving signals sequentially to the plurality of first electrode strips; and determining, by the identification device, a morphology of a fingerprint based on signals received from the second electrode strips.

Optionally, the method further comprises:

determining, by the identification device, position coordinates of a touch point based on the signals received from the plurality of second electrode strips.

BRIEF DESCRIPTION OF THE DRAWINGS

Drawings are used for providing further understanding to the present application, constituting a part of the specification, and explaining the present application in conjunction with the following embodiments, but not intended to limit the present application. In the drawings.

Figure 1:
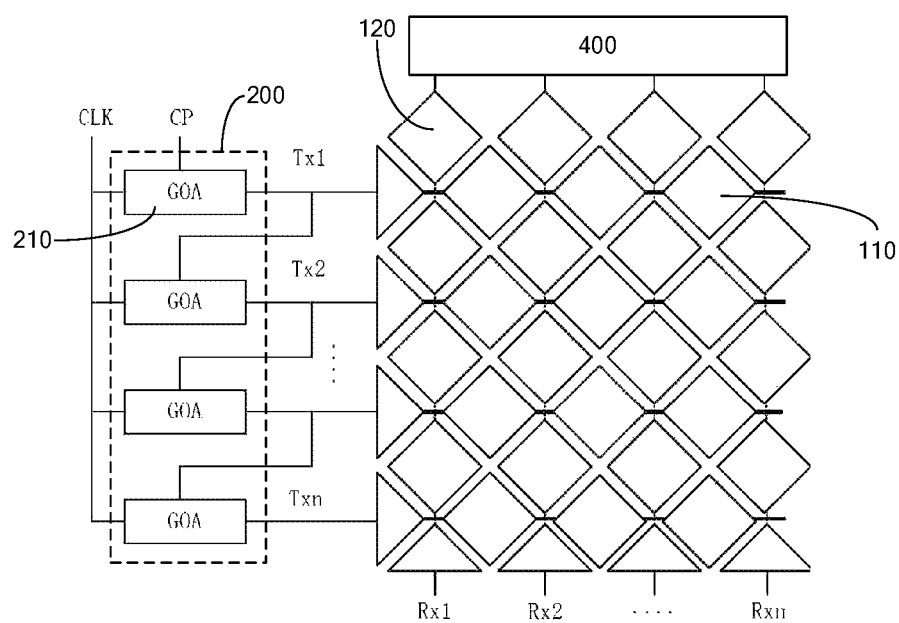
FIG. 1 is a diagram illustrating a circuit structure of a fingerprint identification panel of an embodiment of the present application.

| Reference numerals: | |
|---|---|
| 110: first sub-electrode | 120: second sub-electrode |
| 200: scanning device | 210: shift register |
| 300: identification device | 400: sensing signal providing device |

DETAILED DESCRIPTION

Embodiments of the present application will be explained in detail below in conjunction with drawings. It should be noted that the embodiments described herein are only used to illustrate and explain the present application, but not to limit the present application.

In an existing fingerprint identification device, since each fingerprint identification electrode is connected with one signal lead wire, in order to increase detection accuracy, it is required to increase amount of the fingerprint identification electrodes and thus the amount of the signal lead wires will be increased accordingly, resulting in a large size of the fingerprint identification device and a large space to be occupied.

Therefore, it is desired to arrange the fingerprint identification electrodes as many as possible without increasing the size of the fingerprint identification device.

Figure 3:
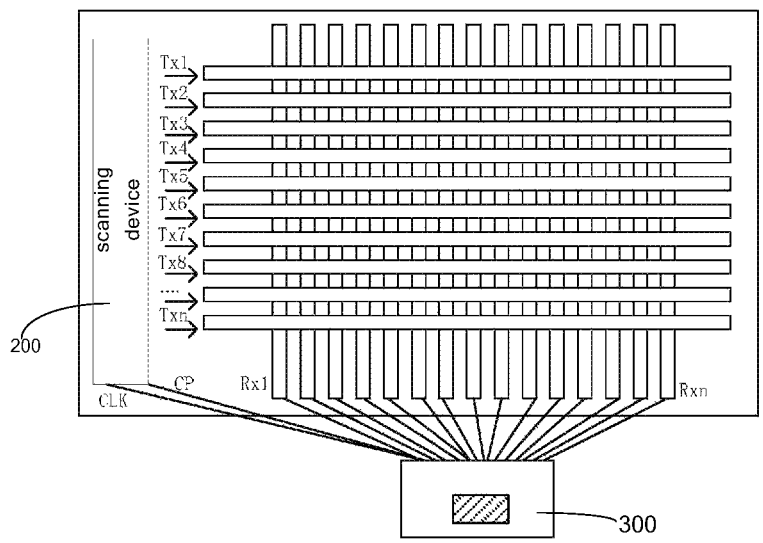
FIG. 3 is a diagram illustrating another circuit structure of a fingerprint identification panel of an embodiment of the present application.

As shown in FIG. 1 and FIG. 3, a fingerprint identification panel provided in the present application includes a plurality of first electrode strips, a plurality of second electrode strips, a scanning device 200, a sensing signal providing device 400 and an identification device 300 (see FIG. 3). As shown in FIG. 1, each of the first electrode strips include a plurality of first sub-electrodes 110 connected in series, and each of the second electrode strips include a plurality of second sub-electrodes 120 connected in series.

The plurality of first electrode strips and the plurality of second electrode strips are insulated from and intersected with each other.

The scanning device 200 is configured to provide driving signals to the plurality of first electrode strips in turn, and the sensing signal providing device 400 is configured to provide a sensing signal to each second electrode strip.

Figure 2:
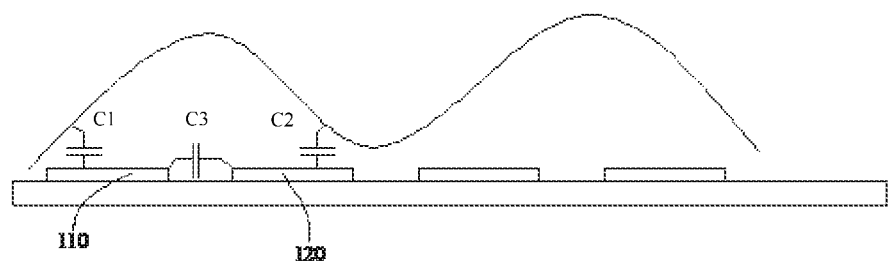
FIG. 2 is a diagram illustrating operation principle for identifying a finger by a fingerprint identification panel in the present application.

In a case that one first electrode strip receives the driving signal, a capacitor may be formed between the first electrode strip and an adjacent second electrode strip, as shown in FIG. 2.

As shown in FIG. 3, the plurality of second electrode strips are connected with the identification device 300, and the identification device 300 is configured to determine a morphology of a fingerprint based on signals transmitted to the identification device 300 by the second electrode strips.

As shown in FIG. 2, in a case that a fingerprint covers above the powered first electrode strip and second electrode strip, the fingerprint, a capacitor C1 and a capacitor C2 respectively formed between the fingerprint and the first electrode strip and the second electrode strip, a capacitor C3 formed between the first electrode strip and the second electrode strip, the first electrode strip and the second electrode strip form a loop, resulting in change in electricity quantity of the capacitor C3.

The fingerprint includes ridges and valleys, since a distance from a ridge to the fingerprint identification panel is different from that from a valley to the fingerprint identification panel, changes in electricity quantity caused by the ridge and the valley are different, and therefore, whether the fingerprint above the first electrode strip and the second electrode strip is a ridge or a valley can be determined based on the changes in electricity quantity of the capacitor C3.

Figure 4:
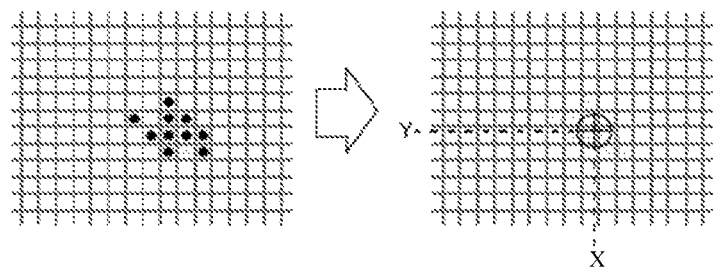
FIG. 4 is a diagram illustrating determination of coordinates of a touch point.

As shown in FIG. 4, the plurality of first electrode strips and the plurality of second electrode strips are intersected with each other, thus the fingerprint identification panel may be divided into multiple cells (each cell is formed as a node). When the surface of the fingerprint identification panel is touched by a finger, a plurality of cells are covered, causing changes in electricity quantities of capacitors formed between first electrode strips and second electrode strips corresponding to the cells. Thus signals transmitted to the identification device 300 from the second electrode strips may be changed. When the surface of the fingerprint identification panel is touched by the finger, electricity quantities of the capacitors corresponding to a plurality of cells may be changed, and then points at which changes in the electricity quantities of the capacitors are larger than a preset threshold are reported, as effective points, to the identification device 300. Coordinates (including a coordinate on an X axis and a coordinate on a Y axis) of a point at a center position of all of the effective points is determined as coordinates of a touch point by the identification device 300.

Figure 5:
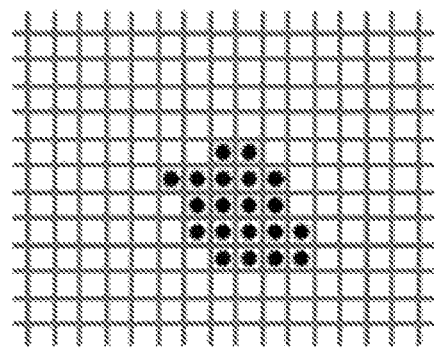
FIG. 5 is a diagram illustrating generation of morphology of a fingerprint.

While determining the coordinates of the touch point, the identification device 300 can determine morphology of the fingerprint according to specific changes in electricity quantities of points at which the changes in electricity quantities exceed the preset threshold. Specifically, change in the electricity quantity of a point corresponding to a valley of the fingerprint is greater than that of a point corresponding to a ridge of the fingerprint, based on which, the identification device 300 can determine the morphology of the fingerprint, as shown in FIG. 5.

One first electrode strip is connected with one lead wire, that is, the first sub-electrodes in a single first electrode strip are connected with a single lead wire. Similarly, one second electrode strip is connected with the identification device through a single lead wire while being connected with the sensing signal providing device through a single lead wire, that is, the second sub-electrodes in a single second electrode strip are connected with the identification device through a single lead wire, and are connected with the sensing signal providing device through a single lead wire, thereby reducing the number of lead wires, so the space for arranging the first electrode strips and second electrode strips is enlarged, and space for arranging the lead wires is reduced. Compared with the self-capacitive fingerprint identification apparatus in the prior art, in the same space, more first sub-electrodes and second sub-electrodes can be arranged in the fingerprint identification panel provided by the present application, so that the accuracy of fingerprint identification can be improved.

In the implementations of FIG. 1 and FIG. 3, the fingerprint identification panel comprises N first electrode strips, a first first electrode strip is connected with the scanning device 200 through a lead wire Tx1, a second first electrode strip is connected with the scanning device 200 through a lead wire Tx2, and so on, an n-th first electrode strip is connected with the scanning device 200 through a lead wire Txn. The fingerprint identification panel comprises N second electrode strips, a first second electrode strip is connected with the identification device 300 through a lead wire Rx1, and so on, an n-th second electrode strip is connected with the identification device 300 through a lead wire Rxn.

In the present application, there is no special limitation to specific structures of the first electrode strips and the second electrode strips.

In the embodiment shown in FIG. 1, each first electrode strip includes a plurality of first sub-electrodes 110 electrically connected in series, each second electrode strip includes a plurality of second sub-electrodes 120 electrically connected in series, the fingerprint identification panel also includes a base substrate, the first sub-electrodes and the second sub-electrodes are disposed on the base substrate. In this way, the overall thickness of the fingerprint identification panel can be reduced. Of course, the first sub-electrodes and the second sub-electrodes may also be disposed on different base substrates.

In the embodiment shown in FIG. 3, each first electrode strip is formed by one strip-shaped first sub-electrode, each second electrode strip is formed by one strip-shaped second sub-electrode, and the first electrode strips and the second electrode strips are respectively arranged on two different base substrates, and then the two base substrates are assembled together, so that the first electrode strips and the second electrode strips are intersected with each other.

FIG. 1 shows an implementation of the first sub-electrodes 110 and the second sub-electrodes 120. In this implementation, both the first sub-electrodes 110 and second sub-electrodes 120 are of a diamond shape. The second sub-electrodes 120 of a single second electrode strip are directly connected with each other, and the first sub-electrodes 110 of a single first electrode strip are connected through metal bridges. Alternatively, the first sub-electrodes 110 of a single first electrode strip are directly connected with each other, and the second sub-electrodes 120 of a single second electrode strip are connected through metal bridges. In this implementation, the first sub-electrodes 110 and the second sub-electrodes 120 can be arranged throughout the whole identification region, thus increasing the number of electrodes, so that the morphology of the fingerprint can be identified more accurately.

In the present application, there is no special restriction to the specific material of the first sub-electrodes 110 and the second sub-electrodes 120.

As an optional implementation, the first sub-electrodes 110 and the second sub-electrodes 120 may be made of a transparent electrode material (for example, ITO). In this implementation, the fingerprint identification panel may be provided in a display region of a display panel and stacked on the display panel. Since the first sub-electrodes 110 and the second sub-electrodes 120 are made of a transparent electrode material, in a case that the fingerprint identification panel is provided on the light emergent side of the display panel, a normal display of the display panel will not be affected. Because the first sub-electrodes 110 and the second sub-electrodes 120 are arranged throughout the fingerprint identification panel, no matter which position of the fingerprint identification panel is touched by a finger, the morphology of the fingerprint can be identified, enlarging the operation area of the fingerprint identification panel.

In order to further improve the accuracy of fingerprint detection, optionally, the first sub-electrodes 110 and the second sub-electrodes 120 have a maximum length no larger than 50 μm.

In order to provide driving signals, as shown in FIG. 1, optionally, the scanning device 200 includes multiple cascaded shift registers 210, each shift register 210 corresponds to one first electrode strip, and the shift register 210 can provide a driving signal to the first electrode strip corresponding to the shift register 210.

Figure 7:
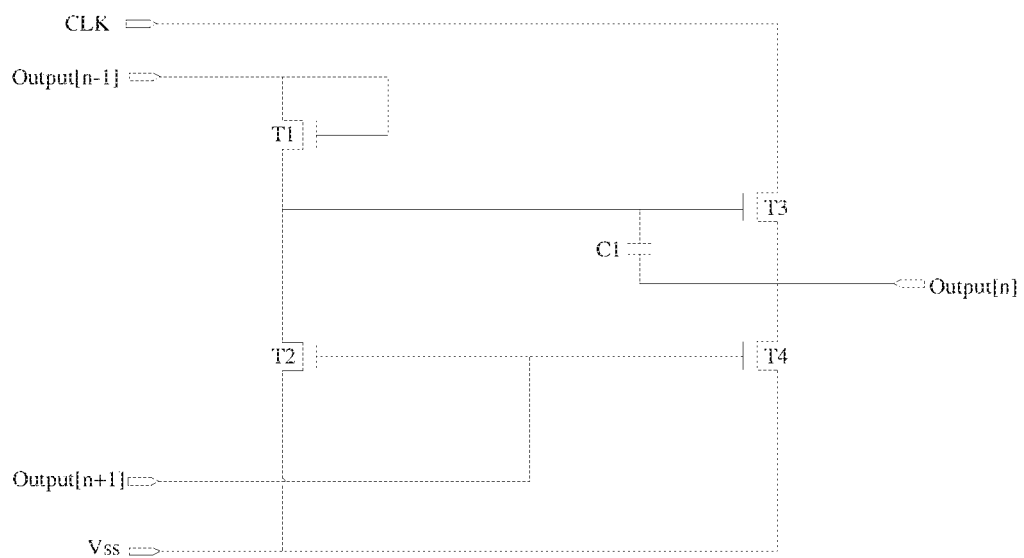
FIG. 7 is a circuit diagram of a fingerprint identification panel in the present application.

As shown in FIG. 1, the scanning device includes a clock signal line, a trigger signal input terminal CP and a reset signal input terminal. FIG. 7 shows a shift register with a simple structure, as shown in FIG. 7, the shift register includes a clock signal terminal CLK, a signal input terminal Output[n−1], a low level signal terminal Vss, a storage capacitor C1, a plurality of transistors, a reset terminal and a signal output terminal Output[n], and the plurality of transistors include a pull-up transistor T3, an input transistor T1, a pull-down transistor T4 and a pull-down control transistor T2. Here n is the number of stages of the shift registers, and n is a nature number.

A first electrode of the input transistor T1 is connected with the signal input terminal Output[n−1], and a gate of the input transistor T1 is connected with the first electrode of the input transistor T1.

A gate of the pull-up transistor T3 is connected with a second electrode of the input transistor T1, a first electrode of the pull-up transistor T3 is connected with the clock signal terminal CLK, and a second electrode of the pull-up transistor T3 is connected with the signal output terminal Output[n].

A first terminal of the storage capacitor C1 is connected with the gate of the pull-up transistor T3, and a second terminal of the storage capacitor C1 is connected with the second electrode of the pull-up transistor T3.

A gate of the pull-down transistor T4 and a gate of the pull-down control transistor T2 are connected and both are connected with the reset terminal of the shift register, a first electrode of the pull-down transistor T4 is connected with the signal output terminal Output[n] and a second electrode of the pull-down transistor T4 is connected with the low level signal terminal Vss.

A first electrode of the pull-down control transistor T2 is connected with the second electrode of the input transistor T1, and a second electrode of the pull-down control transistor T2 is connected with the low level signal terminal Vss.

The signal input terminal Output[0] of the shift register of the first stage is connected with the trigger signal input terminal CP, and the signal input terminal of each of the shift registers of the remaining stages is connected with the signal output terminal of the shift register of a previous stage.

The reset terminal of the shift register of the last stage is connected with the reset signal input terminal, and the reset terminal of each of the shift registers of the remaining stages is connected with the signal output terminal Output[n+1] of the shift register of a next stage.

Figure 6:
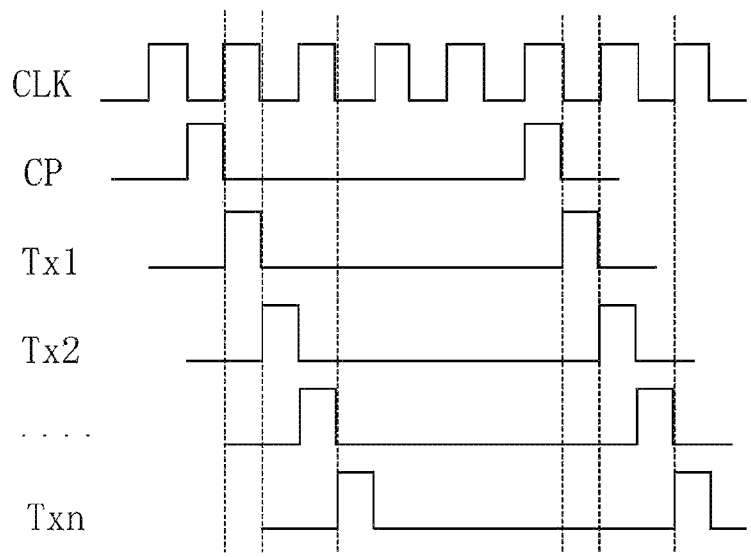
FIG. 6 is a timing chart of signals during operation of a fingerprint identification panel in the present application.

An operation period of the shift register includes a charging stage, an output stage and a pull-down stage. FIG. 6 shows a timing chart of signals at respective stages.

In the charging stage, the input signal is at a high level, the input transistor T1 is turned on so as to charge the first capacitor C1, in this stage, the pull-up transistor T3 is turned on, a signal input through the clock signal input terminal CLK is at a low level, and therefore, the pull-up transistor T3 outputs a low-level signal to the signal output terminal.

In the pull-up stage, the input signal is at a low level, the input transistor T1 is turned off, and the pull-up transistor T3 is turned on due to the bootstrap of the first capacitor C1. At this time, an input signal of the clock signal terminal CLK is at a high level, so the pull-up transistor T3 outputs a high-level signal to the signal output terminal.

In the pull-down stage, the pull-down control transistor T2 and the pull-down transistor T4 are turned on, so that a level at the output terminal of the shift register can be pulled down.

It can be seen that the signal received by the first electrode strip is actually a clock signal provided by the clock signal line. The trigger signal input by the trigger signal input terminal CP is a field synchronization signal, which is initially at a high level, of the first electrode strip. At the time when a first rising edge of the clock signal arrives, a first first electrode strip is charged, and in the meanwhile the trigger signal becomes at a low level. Then at the time when a second rising edge of the clock signal arrives, a second first electrode strip is charged, and so on. At each rising edge of the clock signal, one of the first electrode strips is charged. When a finger contacts a position of the fingerprint identification panel, change in a capacitance at the position occurs. The second electrode strips detect the change and transmit it, as a signal, to the identification device. After signals of all nodes are processed, the morphology of the fingerprint can be obtained.

Optionally, the identification device can also determine the position at which the finger touches the fingerprint identification panel according to the signals transmitted by the second electrode strips. In this implementation, the fingerprint recognition panel has both functions of fingerprint identification and touch control.

The coordinates of the touch point are composed of the row number of the first electrode strip receiving a driving signal (that is, coordinate on the Y axis in FIG. 4) and the column number of the second electrode strip at which the signal changes (that is, coordinate on the X axis in FIG. 4).

In order to determine the row number of the first electrode strip that is receiving the driving signal, optionally, a counter may be provided in the fingerprint identification panel. The count value obtained by the counter is the number of the clock signal plus 1. An initial number of the clock signal is 0 and the count value is 1, which indicates that the first first electrode strip is receiving a scanning signal, and so no. The coordinates of the touch point can be determined according to the row number of the first electrode strip that is receiving the scanning signal and the column number of the second electrode strip at which the signal is changed.

When the count value obtained by the counter is n, the clock number is cleaned up when the next count begins.

In the fingerprint identification panel of the present application, one first electrode strip is connected with a single lead wire, one second electrode strip is connected with the identification device through a single lead wire while being connected with the sensing signal providing device through a single lead wire, thereby the space for arranging the first electrode strips and second electrode strips is enlarged, and space for arranging the lead wires is reduced. Compared with the self-capacitive fingerprint identification apparatus in the prior art, in the same space, more first sub-electrodes and second sub-electrodes can be arranged in the fingerprint identification panel provided by the present application, so that the accuracy of fingerprint identification can be improved.

As another aspect of the present application, there is also provided a display apparatus comprising a fingerprint identification panel and a display panel, wherein the fingerprint identification panel is the above fingerprint identification panel.

It could be easily understood that the fingerprint identification panel should not affect the normal display of the display apparatus.

Optionally, the display apparatus includes a comparison device, wherein a standard fingerprint is stored in the comparison device in advance, and the comparison device can determine whether or not a fingerprint identified by the fingerprint identification panel matches with the standard fingerprint.

In the present application, the fingerprint identification device can be configured to identify whether an acquired fingerprint is a pre-stored fingerprint, thus improving the operation security of the display apparatus.

Optionally, the fingerprint identification panel can identify a fingerprint in real time, and the comparison device can generate a command for controlling the display apparatus to stop performing a touch operation in case of mismatch between the fingerprint identified by the fingerprint identification panel and the fingerprint pre-stored in the display apparatus.

In a case that the first sub-electrodes and the second sub-electrodes are made of a transparent material, the fingerprint identification panel can be provided on a light emergent surface of a display region of the display panel, that is, the fingerprint identification panel is of an on-cell type. In this implementation, the display panel and the fingerprint identification panel can be independently driven so that the structure of each drive circuit can be simplified.

As another aspect of the present application, there is further provided a method for driving the fingerprint identification panel, the method comprising:

applying, by the scanning device, driving signals sequentially to the plurality of first electrode strips; and determining, by the identification device, a morphology of a finger based on signals received from the plurality of second electrode strips.

As described above, the fingerprint identification panel also has a function of determining the coordinates of a touch point, and therefore, the driving method further includes:

determining, by the identification device, position coordinates of a touch point based on the signals received from the plurality of second electrode strips.

It should be understood that, the foregoing embodiments are only exemplary embodiments used for explaining the principle of the present invention, but the present invention is not limited thereto. Various variations and improvements may be made by a person skilled in the art without departing from the spirit and essence of the present invention, and these variations and improvements also fall into the protection scope of the present invention.

The invention claimed is:

1. A fingerprint identification panel, comprising a plurality of first electrode strips, a plurality of second electrode strips, a scanning device, a sensing signal providing device and an identification device, wherein
   the plurality of first electrode strips and the plurality of second electrode strips are insulated from and intersected with each other;
   the scanning device is configured to provide driving signals to the plurality of first electrode strips in turn, and the sensing signal providing device is configured to provide sensing signals to the plurality of second electrode strips, and a capacitor is formed between each of the plurality of first electrode strips and one second electrode strip adjacent to the first electrode strip;
   the plurality of second electrode strips are connected with the identification device, and are configured to transmit signals that reflect electricity quantities of the capacitors to the identification device;
   the identification device is configured to determine a morphology of a fingerprint based on the signals received from the second electrode strips, and
   the fingerprint identification panel further comprises a counter, a driving signal received by one first electrode strip is a clock signal, coordinates of a touch point are composed of a row number of the one first electrode strip receiving the driving signal and a column number of one second electrode strip at which the signal changed, a count value obtained by the counter is the number of the clock signal plus 1, and a row number of the one first electrode strip corresponding to the touch point is determined based on the counter value of the counter.

2. The fingerprint identification panel of claim 1, wherein each of the plurality of first electrode strips comprises a plurality of first sub-electrodes electrically connected in series, each of the plurality of second electrode strips comprises a plurality of second sub-electrodes electrically connected in series, and the fingerprint identification panel further comprises a base substrate, the first sub-electrodes and the second sub-electrodes being provided on the base substrate.

3. The fingerprint identification panel of claim 2, wherein both the first sub-electrodes and the second sub-electrodes have a maximum length no larger than 50 μm.

4. The fingerprint identification panel of claim 1, wherein both first sub-electrodes and second sub-electrodes are made of transparent material.

5. The fingerprint identification panel of claim 2, wherein both the first sub-electrodes and the second sub-electrodes are of a diamond shape.

6. The fingerprint identification panel of claim 1, wherein the plurality of first electrode strips and the plurality of second electrode strips are provided on different base substrates.

7. The fingerprint identification panel of claim 1, wherein the scanning device comprises a plurality of cascaded shift registers, each shift register corresponds to one of the first electrode strips, and the shift register is configured to provide a driving signal to the first electrode strip corresponding to the shift register.

8. The fingerprint identification panel of claim 7, wherein the scanning device comprises a clock signal line, a trigger signal input terminal and a reset signal input terminal, each shift register comprises a clock signal terminal, a signal input terminal, a low level signal terminal, a storage capacitor, a plurality of transistors, a reset terminal and a signal output terminal, and the plurality of transistors comprise a pull-up transistor, an input transistor, a pull-down transistor and a pull-down control transistor, wherein
   the clock signal terminal is connected with the clock signal line;
   a first electrode of the input transistor is connected with the signal input terminal, and a gate of the input transistor is connected with the first electrode of the input transistor;
   a gate of the pull-up transistor is connected with a second electrode of the input transistor, a first electrode of the pull-up transistor is connected with the clock signal terminal, and a second electrode of the pull-up transistor is connected with the signal output terminal;
   a first terminal of the storage capacitor is connected with the gate of the pull-up transistor, and a second terminal of the storage capacitor is connected with the second electrode of the pull-up transistor;

a gate of the pull-down transistor and a gate of the pull-down control transistor are connected and both are connected with the reset terminal of the shift register, a first electrode of the pull-down transistor is connected with the signal output terminal, and a second electrode of the pull-down transistor is connected with the low level signal terminal;

a first electrode of the pull-down control transistor is connected with the second electrode of the input transistor, and a second electrode of the pull-down control transistor is connected with the low level signal terminal;

the signal input terminal of the shift register of a first stage is connected with the trigger signal input terminal, and the signal input terminal of each of the shift registers of the remaining stages is connected with the signal output terminal of the shift register of a previous stage; and the reset terminal of the shift register of a last stage is connected with the reset signal input terminal, and the reset terminal of each of the shift registers of the remaining stages is connected with the signal output terminal of the shift register of a next stage.

9. The fingerprint identification panel of claim 8, wherein the plurality of transistors are N type transistors.

10. The fingerprint identification panel of claim 1, wherein the identification device is further configured to determine a position at which a finger touches the fingerprint identification panel based on the signals received from the second electrode strips.

11. A display apparatus, comprising a fingerprint identification panel and a display panel, wherein the fingerprint identification panel is the fingerprint identification panel of claim 1.

12. The display apparatus of claim 11, further comprising a comparison device, wherein a standard fingerprint is stored in the comparison device in advance, and the comparison device is configured to determine whether or not a fingerprint identified by the fingerprint identification panel matches with the standard fingerprint.

13. The display apparatus of claim 12, wherein the fingerprint identification panel is configured to identify a fingerprint in real time, the fingerprint identification panel is further configured to determine a position of a touch point, and the comparison device is configured to generate an instruction for controlling the display apparatus to stop performing a touch operation in case of mismatch between the fingerprint identified by the fingerprint identification panel and the standard fingerprint.

14. The display apparatus of claim 11, wherein in a case that the first sub-electrodes and the second sub-electrodes are made of a transparent material, the fingerprint identification panel is provided within a display region of the display panel.

15. A display apparatus, comprising a fingerprint identification panel and a display panel, wherein the fingerprint identification panel is the fingerprint identification panel of claim 2.

16. The display apparatus of claim 15, further comprising a comparison device, wherein a standard fingerprint is stored in the comparison device in advance, and the comparison device is configured to determine whether or not a fingerprint identified by the fingerprint identification panel matches with the standard fingerprint.

17. The display apparatus of claim 16, wherein the fingerprint identification panel is configured to identify a fingerprint in real time, the fingerprint identification panel is further configured to determine a position of a touch point, and the comparison device is configured to generate an instruction for controlling the display apparatus to stop performing a touch operation in case of mismatch between the fingerprint identified by the fingerprint identification panel and the standard fingerprint.

18. The display apparatus of claim 15, wherein in a case that the first sub-electrodes and the second sub-electrodes are made of a transparent material, the fingerprint identification panel is provided within a display region of the display panel.

19. A method for driving a fingerprint identification panel to identify a fingerprint, wherein the fingerprint identification panel is the fingerprint identification panel of claim 1, and the method comprises:
   applying, by the scanning device, driving signals sequentially to the plurality of first electrode strips; and
   determining, by the identification device, a morphology of a finger based on signals received from the second electrode strips.

20. The method of claim 19, further comprising:
   determining, by the identification device, position coordinates of the touch point based on the signals received from the plurality of second electrode strips.

* * * * *